(12) United States Patent
Gong et al.

(10) Patent No.: US 11,907,491 B2
(45) Date of Patent: Feb. 20, 2024

(54) SENSING UNIT AND SENSING DEVICE (71) Applicant: Shanghai Tianma Micro-Electronics Co., Ltd., Shanghai (CN)

(72) Inventors: Shun Gong, Shanghai (CN); Linzhi Wang, Shanghai (CN); Kerui Xi, Xiamen (CN); Jiansheng Zhong, Xiamen (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/956,663

(22) Filed: Sep. 29, 2022

(65) Prior Publication Data

US 2023/0418425 A1 Dec. 28, 2023

(30) Foreign Application Priority Data

Jun. 28, 2022 (CN) .......................... 202210752280.6

(51) Int. Cl.
*G06F 3/044* (2006.01)
*G06V 40/13* (2022.01)

(52) U.S. Cl.
CPC .......... *G06F 3/0448* (2019.05); *G06F 3/0443* (2019.05); *G06F 3/0446* (2019.05); *G06V 40/1306* (2022.01)

(58) Field of Classification Search
None
See application file for complete search history.

(56) References Cited

U.S. PATENT DOCUMENTS

| | | | |
|---|---|---|---|
| 2016/0328058 A1* | 11/2016 | Peng | H01L 27/124 |
| 2017/0255310 A1* | 9/2017 | Miyamoto | G06F 3/0443 |
| 2019/0286269 A1* | 9/2019 | Choi | G06F 3/0412 |

FOREIGN PATENT DOCUMENTS

| | | | | |
|---|---|---|---|---|
| CN | 202013558 U | * | 10/2011 | G06F 3/0412 |
| CN | 106952612 A | * | 7/2017 | G06F 3/0412 |
| CN | 112002733 A | | 11/2020 | |

* cited by examiner

*Primary Examiner* — Duane N Taylor, Jr.
(74) *Attorney, Agent, or Firm* — Anova Law Group, PLLC (57) ABSTRACT

A sensing unit and a sensing device are provided. The sensing unit includes a substrate; a plurality of thin-film transistors and a plurality of sensing electrodes disposed on a side of the substrate; and a ring electrode disposed on a first electrode layer. The first electrode layer is located on a side of a thin-film transistor of the plurality of thin-film transistors away from the substrate. The plurality of sensing electrodes are disposed on the first electrode layer, and the ring electrode is disposed around the plurality of sensing electrodes.

18 Claims, 8 Drawing Sheets

SENSING UNIT AND SENSING DEVICE

CROSS-REFERENCE TO RELATED APPLICATION

This application claims the priority of Chinese Patent Application No. 202210752280.6, filed on Jun. 28, 2022, the content of which is incorporated by reference in its entirety.

TECHNICAL FIELD

The present disclosure generally relates to the field of sensing technologies and, more particularly, relates to a fingerprint identification device and a touch display device in a sensing device.

BACKGROUND

With the development of the times, the requirements for sensing technologies in the field of fingerprint identification and touch display technologies are getting higher and higher, and the current fingerprint identification devices and touch display devices still have certain problems, such as insensitive sensing, and long response time, etc.

Therefore, there is an urgent need to develop a sensing unit and a sensing device that can improve the sensitivity, shorten the response time, and meet the market demand. The present disclosed sensing units and sensing devices are direct to solve one or more problems set forth above and other problems in the arts.

SUMMARY

One aspect of the present disclosure provides a sensing unit. The sensing unit includes a substrate; a plurality of thin-film transistors and a plurality of sensing electrodes disposed on a side of the substrate; and a ring electrode disposed on a first electrode layer. The first electrode layer is located on a side of a thin-film transistor of the plurality of thin-film transistors away from the substrate. The plurality of sensing electrodes are disposed on the first electrode layer, and the ring electrode is disposed around the plurality of sensing electrodes.

Another aspect of the present disclosure provides a sensing device. The sensing device includes a sensing unit, a driving circuit and a data reading circuit. The sensing unit includes a substrate; a plurality of thin-film transistors and a plurality of sensing electrodes disposed on a side of the substrate; and a ring electrode disposed on a first electrode layer. The first electrode layer is located on a side of a thin-film transistor of the plurality of thin-film transistors away from the substrate. The plurality of sensing electrodes are disposed on the first electrode layer, and the ring electrode is disposed around the plurality of sensing electrodes. A gate of the thin-film transistor is electrically connected to the driving circuit through a gate line. The source of the thin-film transistor is electrically connected to the signal reading circuit through a data line. The gate line and the data line intersect each other.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

To better understand the technical solutions of the present disclosure, the present disclosure will be further described in detail below with reference to the accompanying drawings and embodiments. It should be understood that the described embodiments are only some, but not all, embodiments of the present disclosure. Based on the embodiments of the present disclosure, all other embodiments obtained by those of ordinary skill in the art without creative efforts shall fall within the protection scope of the present disclosure.

It should be understood that the specific embodiments described herein are only used to explain the present disclosure, but not to limit the present disclosure. In addition, it should be noted that, for the convenience of description, the drawings only show some but not all structures related to the present disclosure. As used in the embodiments of the present disclosure and the appended claims, the singular forms "a", "said", and "the" are intended to include the plural forms as well, unless the context clearly dictates otherwise.

The terms used in the embodiments of the present disclosure are only for the purpose of describing specific embodiments, and are not intended to limit the present disclosure. It should be noted that the directional words such as "up", "down", "left", "right" described in the embodiments of the present disclosure are described from the angles shown in the drawings, and should not be construed as limitation example implementing the present disclosure. Also, in this context, it will also be understood that when an element is referred to as being formed "on" or "under" another element, it can not only be directly formed "on" or "under" the other element, but also indirectly formed "on" or "under" another element through intervening elements. The terms "first", or "second", etc., are used for descriptive purposes only and do not imply any order, quantity, or importance, but are merely used to distinguish the different components. For those of ordinary skill in the art, the specific meanings of the above terms in the present disclosure can be understood according to specific situations.

Before describing the technical solutions provided by the embodiments of the present disclosure, a sensing unit is first described with reference to FIG. 1.

Sensing units are widely used in fingerprint identification devices and touch display panels. FIG. 1 is a cross-sectional view along a direction perpendicular to the substrate of the sensing unit. As shown in FIG. 1, the sensing unit includes a substrate A, a thin-film transistor 234, a sensing electrode 102 and insulation layers. The thin-film transistor 234 includes a source 201, a drain 202, a gate 301 and an active layer 4. In the touch sensing device of the fingerprint identification device or the touch screen in the display panel, the active layer 4 of the thin-film transistor 234 of the sensing unit adopts the traditional amorphous silicon process. Because of the low electron mobility of amorphous silicon, the response time of the sensing device is long, and the user experience is not as desired. Further, the sensing units in the current products on the market generally have the problems of insensitive sensing and low sensing accuracy. It has been found that the reasons for such issues may include that there is a common phenomenon of electrostatic interference in the sensing units. Because the noise signal caused by static electricity may affect the reading of the sensing signals by the signal reading circuit, the sensing sensitivity and accuracy of the sensing unit may be reduced.

The present disclosure provides a sensing unit and a sensing device to solve the above-mentioned technical problems. The sensing unit may include a substrate, a plurality of thin-film transistors and a plurality of sensing electrodes located on one side of the substrate. The sensing unit may also include a ring electrode. The ring electrode may be located on a first electrode layer. The first electrode layer may be located on the side of the thin-film transistor away from the substrate. The sensing electrode may be located on the first electrode layer; and the ring electrode may be disposed around the sensing electrodes.

Figure 2:
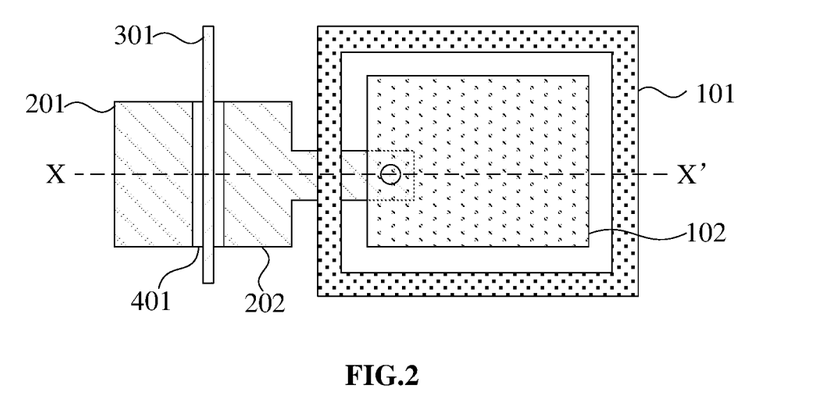
FIG. 2 illustrates a partial top view of an exemplary sensing unit according to various disclosed embodiments of the present disclosure.
Figure 3:
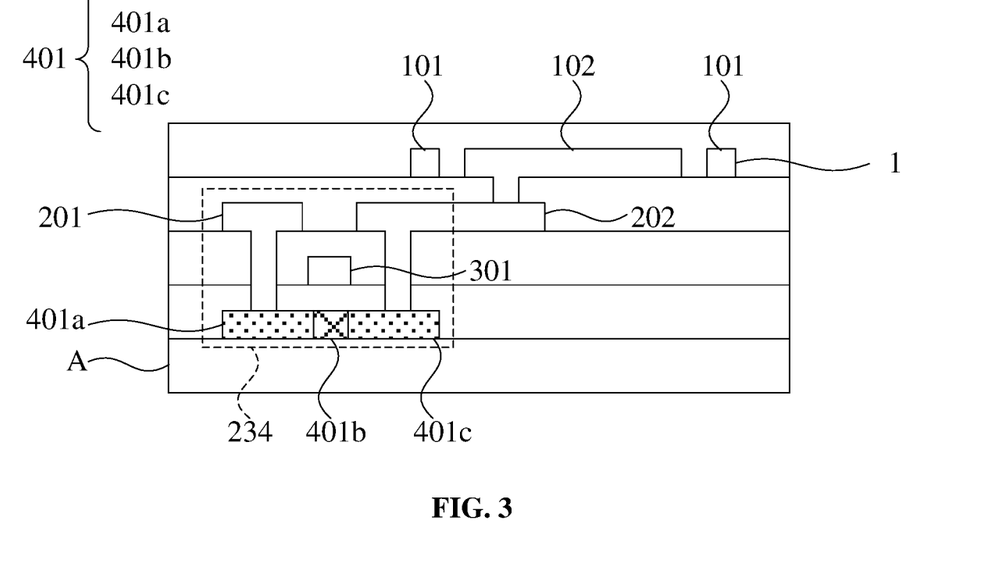
FIG. 3 illustrates an X-X'-sectional view of FIG. 2.

FIG. 2 is a partial top view of an exemplary sensing unit according to various disclosed embodiments of the present disclosure, and FIG. 3 is an X-X'-sectional view of FIG. 2. As shown in FIG. 2 and FIG. 3, the sensing unit provided by the present disclosure may include a substrate A, a thin-film transistor 234 located on one side of the substrate A, a sensing electrode 102, and a ring electrode 101. The ring electrode 101 and the sensing electrode 102 may be both located on a first electrode layer 1. The first electrode layer 1 may be located on the side of the thin-film transistor 234 away from the substrate A, and the ring electrode 101 may be disposed to surround the sensing electrode 102. It should be noted that the sensing unit and the sensing device provided by the present disclosure may also include insulation layers such that the signal lines or other conductive devices that do not need to be electrically connected to each other may be kept insulated from each other, preventing electrical signal interference, and ensuring the normal operation of the sensing unit. Persons of ordinary skill in the art may freely select the materials, shapes, or other characteristics of the insulation layers according to actual use requirements, and the present disclosure does not make any special restrictions on the insulation layers. Further, unless otherwise specified, the thin-film transistor 243 of the sensing unit or sensing device provided by the present disclosure may all include a source 201, a drain 202, a gate 301 and an active layer 401. As shown in FIG. 3, the active layer 401 of the thin-film transistor 234 may include a source conductive region 401a, a channel region 401b and a drain conductive region 401c. The channel region 401b may be located between the source conductive region 401a and the drain conductive region 401c. The orthographic projection of the gate 301 on the substrate A may cover the orthographic projection of the channel region 401b on the substrate A.

It can be understood that the thin-film transistor in other embodiments provided by the present disclosure may also include a source, a drain, a gate and an active layer, and the active layer may also include a source conductive region, a channel region, and a drain conductive region. The channel region may be located between the source conductive region and the drain conductive region, and the orthographic projection of the gate on the base substrate may cover the orthographic projection of the channel region on the substrate. For the convenience of description, in the schematic diagrams of other embodiments provided by the present disclosure, the schematic diagram of the active layer may be simplified, and the source conductive region, the drain conductive region and the channel region of the active layer are not distinguished one by one.

Because a sensing device may often include a plurality of sensing units arranged as an array, and each sensing unit may at least include a thin-film transistor 234 and a sensing electrode 102, and the thin-film transistor 234 and the sensing electrode 102 may have a large area and may be easy to accumulate charges. After the charges accumulated by the thin-film transistor 234 and the sensing electrode 102 reach a certain amount, an electric field may be formed. When the sensing device senses a signal, the signal collected by the sensing electrode may be mainly fed back to the signal reading circuit. The electric field formed by the charges accumulated by the thin-film transistor 234 and the sensing electrode 102 may interfere with the collection of external signals by the sensing electrodes in other sensing units near the sensing unit, resulting in a noise interference and reducing the sensing accuracy and sensitivity of the sensing electrode.

Figure 4:
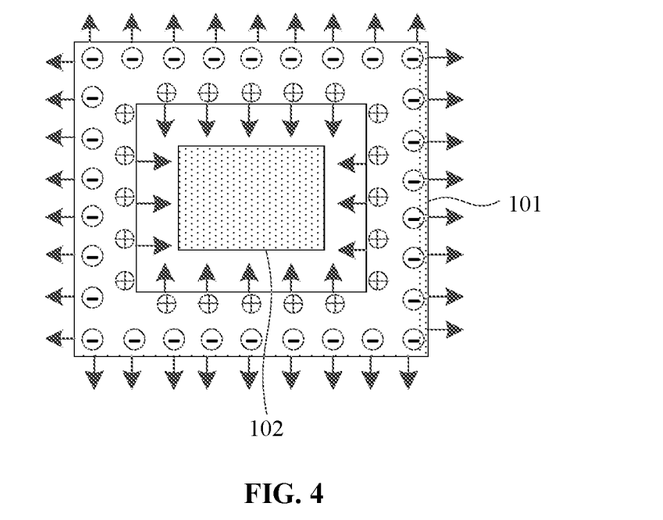
FIG. 4 illustrates an exemplary electric field of a ring electrode according to various disclosed embodiments of the present disclosure.

FIG. 4 is a schematic diagram of the electric field of the ring electrode 101 in one embodiment of the present disclosure. The ring electrode 101 may be disposed to surround the sensing electrode 102. Because the ring electrode 101 may be affected by the electric field, the free electrons in the ring electrode 101 may move in the opposite direction of the electric field under the action of the electric field force, these charges may form another electric field in the opposite direction to the external electric field. Due to the electric field superposition, the sensing electrode 102 may be affected by the electric field formed by the ring electrode 101 and electric field of other sensing units, the two electric fields may cancel each other out because of the reverse superposition, and the total external electric filed affecting the sensing electrode 102 may be zero. Thus, the sensing electrode 102 may be protected from the interference from the electrostatic noise of other sensing units, the sensing signal may be received more stably, and the sensitivity and accuracy of the sensing may be improved. It should be noted that FIG. 4 only uses the electric field caused by the positive charge as an example for illustration, those skilled in the art should understand that when the external electric field of the sensing electrode 102 is the electric field caused by the negative charges, the moving direction of the charges in the ring electrode 101 may be opposite to that shown in FIG. 4, but the influence of the electric field on the sensing electrode 102 may be still zero. For example, the electrostatic shielding effect may also be achieved.

It can be understood that the embodiment shown in the present disclosure is only illustrated with the shape of the ring electrode 101 as a rectangle, but the shape of the ring electrode 101 is not limited to a rectangle, and those skilled in the art can obtain a ring electrode according to the description of the present disclosure. According to the inspiration of the shape, ellipse or other polygons, the effect of electrostatic shielding may also be achieved by setting the ring electrodes as circles, ellipses or other polygons.

Figure 5:
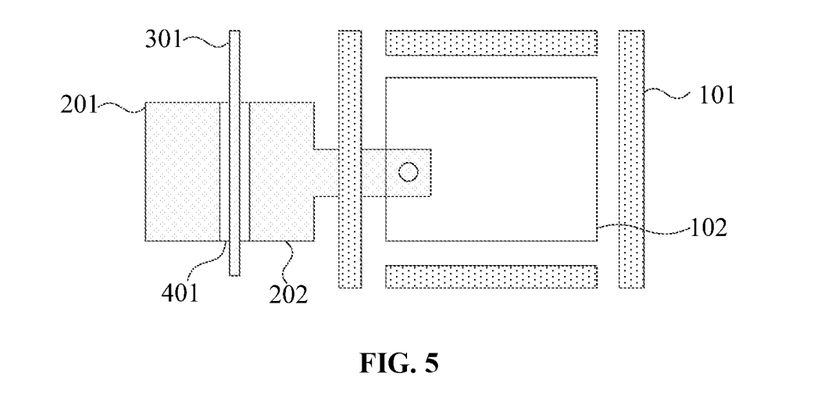
FIG. 5 illustrates a partial top view of another exemplary sensing unit according to various disclosed embodiments of the present disclosure.

FIG. 5 illustrates a partial top view of another exemplary sensing unit according to various disclosed embodiments of the present disclosure. It can be understood that, FIG. 2 and FIG. 3 only show an embodiment in which the ring electrode 101 is in a closed shape, and the embodiments provided by the present disclosure also include the embodiments in which the ring electrode is in a discontinuous shape as shown in FIG. 5. For example, those of ordinary skill in the art may expand to obtain more forms of non-closed-shaped ring electrode without creative work according to the inspiration of the embodiments of the present disclosure, and according to the principle of electric field shielding, the ring electrode 102 may also be protected from the interference of the electric field noise of other sensing units to improve the sensitivity and accuracy of the sensing signal of the sensing device. It can be understood that FIG. 5 only takes the example of setting the ring electrode 101 in a shape of four discontinuous segments. In other embodiments, the ring electrode may also be set with less than or greater than four discontinuous to achieve the effect of electrostatic shielding, the present disclosure does not make special restrictions on the shape and number of segments of the ring electrode.

On the basis of the above-mentioned embodiment, in one embodiment, the ring electrode may be provided with a constant potential.

In one embodiment, referring to FIG. 2 and FIG. 3, it can be understood that the ring electrode 101 may be arranged around the sensing electrode 102, and if a constant potential is provided to the ring electrode 101, in the plane interacting with the sensing electrode 102 and parallel to the substrate A, no matter which direction the sensing electrode 102 is affected by the electric field, there may be a corresponding electric field in the opposite direction to cancel the electric field such that the influence of the sensing electrode 102 by the total external electric field may be zero. For example, a portion of effect by some electrostatic noises of other sensing units may be avoided, the sensing signal may be received more stably, and the sensing sensitivity and accuracy may be improved.

On the basis of the above embodiment, in one embodiment, the first electrode layer 1 may further include a first sub-section, and along a direction perpendicular to the substrate A, the first sub-section and the thin-film transistor may at least partially overlap.

Figure 6:
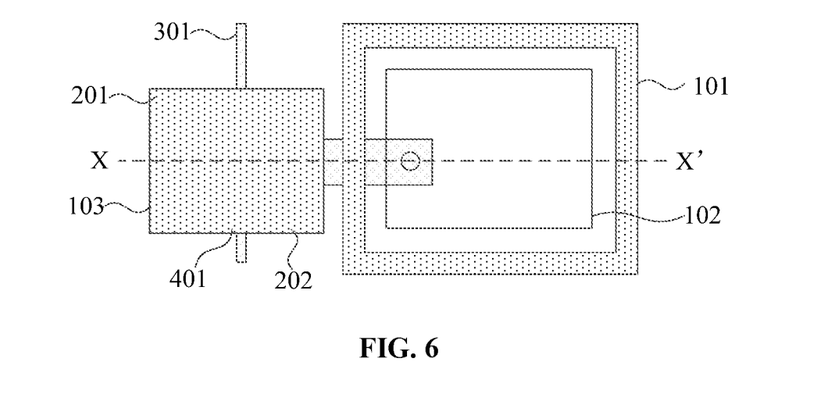
FIG. 6 illustrates a partial top view of another exemplary sensing unit according to various disclosed embodiments of the present disclosure.
Figure 7:
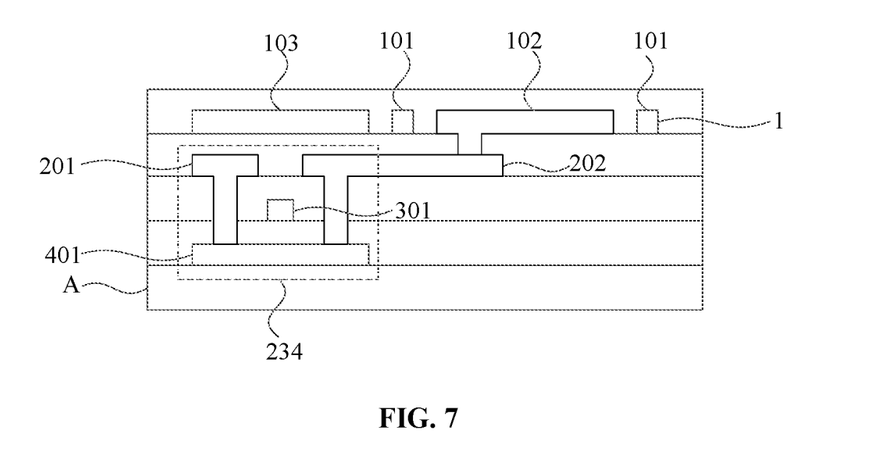
FIG. 7 illustrates an X-X'-sectional view of FIG. 6.

FIG. 6 illustrates a partial top view of another exemplary sensing unit according to various disclosed embodiments of the present disclosure, and FIG. 7 is an X-X'-sectional view of FIG. 6. As shown in FIG. 6 and FIG. 7, the sensing unit may include a substrate A, a thin-film transistor 234, a sensing electrode 102, a ring electrode 101, a first sub-section 103 and various insulation layers. The ring electrode 101, the sensing electrode 102 and the first sub-section 103 may all be located in the first electrode layer 1. Along the direction perpendicular to the substrate A, the first sub-section 103 and the thin-film transistor 234 may at least partially overlap.

As mentioned above, the area between the thin-film transistor 234 and the sensing electrode 102 may be relatively large, and it may be easy to accumulate charges. One of the main sources of electrostatic noise interference for the sensing electrode 102 is the thin-film transistor 234. If the thin-film transistor 234 is disposed in the direction far away from the substrate A, and in the direction perpendicular to the substrate A, the first sub-section 103 and the thin-film transistor 234 may at least partially overlap. Because the first subs-section 103 may be made of metal material with freely moving electrons, the first sub-section 103 may shield the interference of the electric field generated by the sensing unit 234 to other sensing units, and the first sub-section 103 may also shield the electrostatic noise interference of other sensing units to the sensing unit through the first sub-section 103 to improve the sensing sensitivity and accuracy of the sensing unit.

In one embodiment, on the basis of the above embodiment, the present disclosure further provides a sensing unit. The first sub-section may be electrically connected to the ring electrode.

Figure 8:
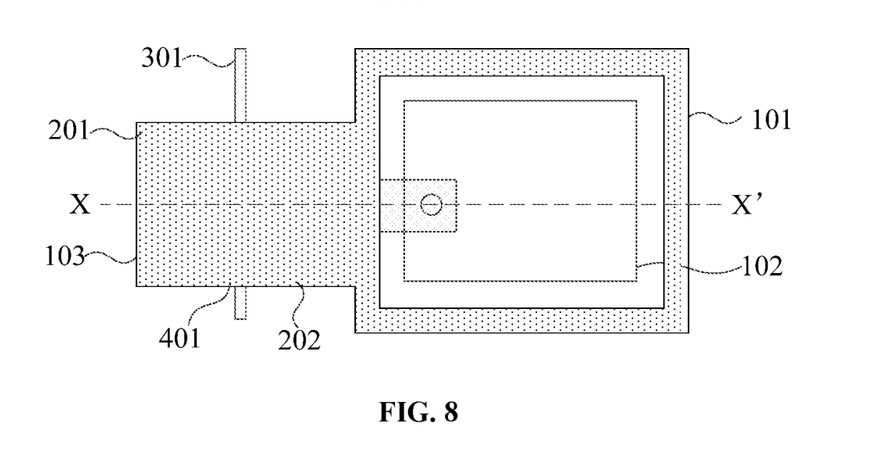
FIG. 8 illustrates a partial top view of another exemplary sensing unit according to various disclosed embodiments of the present disclosure.
Figure 9:
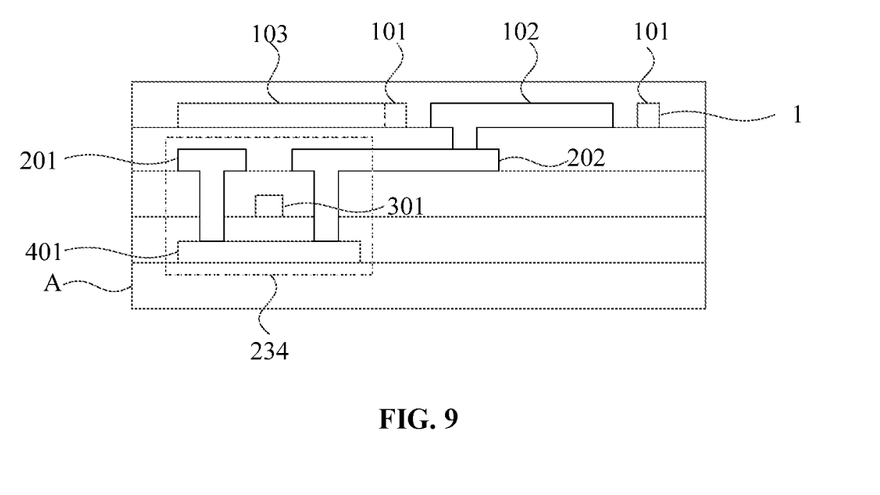
FIG. 9 illustrates an X-X'-sectional view of FIG. 8.

FIG. 8 illustrates a partial top view of another exemplary sensing unit according to various disclosed embodiments of the present disclosure, and FIG. 9 is an X-X'-sectional view of FIG. 8. As shown in FIG. 8 and FIG. 9, when the first sub-section 103 is electrically connected to the ring electrode 101. For example, in the integrated manufacturing, according to the aforementioned electric field shielding principle, such a design scheme may also produce the effect of shielding the electric field interference. At the same time, because of the integrated design of the ring electrode 101 and the first sub-section 103, compared with the design of insulating the first sub-section 103 and the ring electrode 101 as shown in FIG. 6 and FIG. 7, the manufacturing process may be simplified, and the production cost may be saved.

In one embodiment, on the basis of the above embodiments, the sensing unit provided by the present disclosure may include at least one of indium tin oxide or metal molybdenum as the material of the first electrode layer 1.

Referring to FIG. 2-9, to simplify the process and save the production cost, the ring electrode 101, the sensing electrode 102 and the first sub-section 103 of the sensing unit may be all located in the first electrode layer 1. Because the first electrode layer 1 may integrate the ring electrode 101, the sensing electrode 102 and the first sub-section 103, the material of the first electrode layer 1 may be required to enable the sensing electrode 102 to realize the function of sensing signals and the ring electrode 101, and the ring electrode 101 and the first sub-section 103 to realize the function of shielding electrostatic noise. When the material of the first electrode layer 1 is at least one of indium tin oxide or metal molybdenum, the above requirements may be met at the same time.

In one embodiment, on the basis of the above embodiment, the source and drain of the thin-film transistor of the sensing unit provided by the present disclosure are located in a first metal layer. The first metal layer may further include a second sub-section. The second section may be insulated from the source of the thin-film transistor, and the second sub-section and the drain of the thin-film transistor may be insulated from each other. Along the direction perpendicular to the substrate, the second sub-section and the sensing electrode may at least partially overlap.

Figure 10:
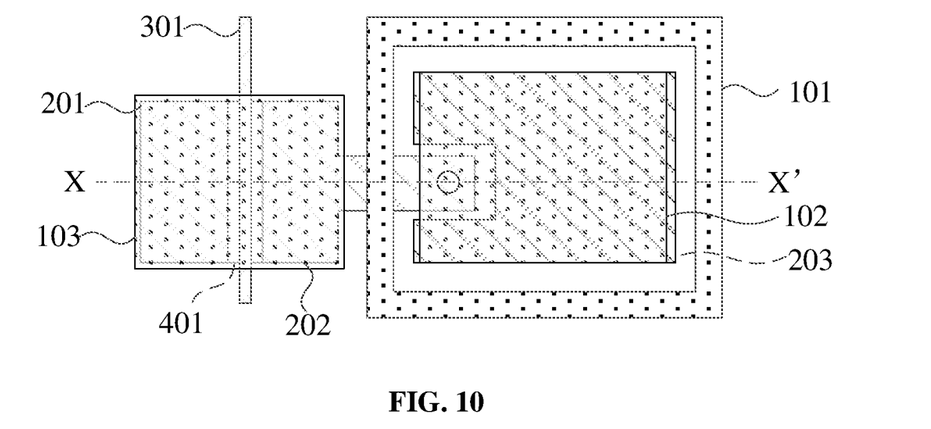
FIG. 10 illustrates a partial top view of another exemplary sensing unit according to various disclosed embodiments of the present disclosure.
Figure 11:
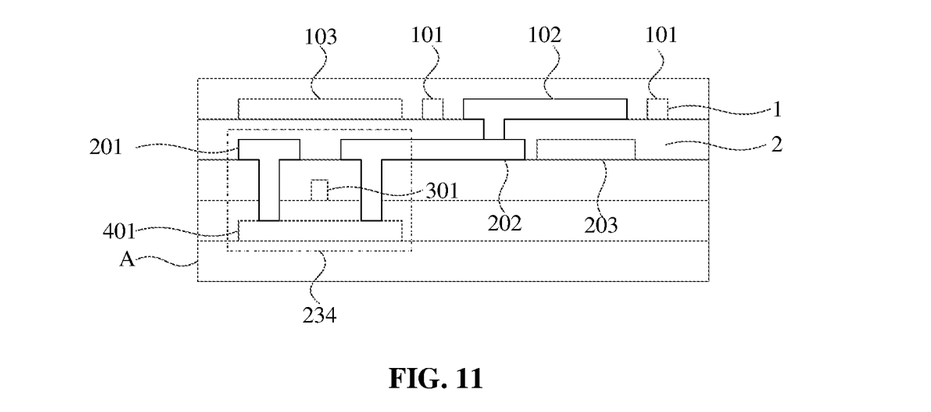
FIG. 11 illustrates an X-X'-sectional view of FIG. 10.

FIG. 10 illustrates a partial top view of another exemplary sensing unit according to various embodiments of the present disclosure, and FIG. 11 is an X-X'-sectional view of FIG. As shown in FIG. 10 and FIG. 11, the source 201 and the drain 202 of the thin-film transistor 234 of the sensing unit provided by the present disclosure may be located in the first metal layer 2, and the first metal layer 2 may further include a second sub-section 203. The second sub-section 203 and the source 201 of the thin-film transistor 234 may be insulated from each other, and the second sub-section 203 and the drain 202 of the thin-film transistor 234 may be insulated from each other. Along the direction perpendicular to the substrate A, the second sub-section 203 and the sensing electrode 102 may at least partially overlap. Because the second sub-section 203 may be disposed on the side of the sensing electrode 102 adjacent to the substrate A, and along the direction perpendicular to the substrate A, the second sub-section 203 and the sensing electrode 102 may at least partially overlap. The second sub-section 203 may be made of metal material, that is, there may be free electrons in the second sub-section 203. When other sensing units form an electrostatic field that can interfere with the sensing electrode 102, the free electrons in the second sub-section 203 may be affected by the electrostatic field. Due to the influence of the electrostatic field, the second sub-section 203 may generate an electric field opposite to the electrostatic field, and the effects of the two electrostatic fields on the sensing electrodes 102 may cancel each other out. Accordingly, the sensitivity and accuracy of the sensing signal of the sensing electrode may be further improved.

In one embodiment, on the basis of the above embodiment, the second sub-section of the sensing unit provided by the present disclosure may be provided with a constant potential.

Further, referring to FIG. 10 and FIG. 11, it can be understood that the second sub-section 203 may be disposed on the first metal layer 2, and the second sub-section 203 may be insulated from the source 201 of the thin-film transistor 234, and the second sub-section 203 may be insulated from the drain 202 of the thin-film transistor 234. In the direction perpendicular to the substrate A, the second sub-second 203 and the sensing electrode 102 may at least partially overlap. If the constant potential is provided to the second sub-section 203, in the space where the substrate A is perpendicular to, no matter which direction the sensing electrode 102 is affected by the electric field, in the opposite direction, there may be a corresponding electric field to cancel the electric field such that the influence of the total external electric field on the sensing electrode 102 may be zero. For example, the sensing electrode 102 may be free from some electrostatic noise interference of other sensing units, and may receive the sensing signal more stable. Accordingly, the sensitivity and accuracy of the sensing may be improved.

In one embodiment, on the basis of the above embodiment, the gate of the thin-film transistor of the sensing unit provided by the present disclosure may be located in the second metal layer. The second metal layer may further include a third sub-section, and the third sub-section and the gate of the thin-film transistor may be insulated from each other. Along the direction perpendicular to the substrate, the third sub-section may at least partially overlap the sensing electrode.

Figure 12:
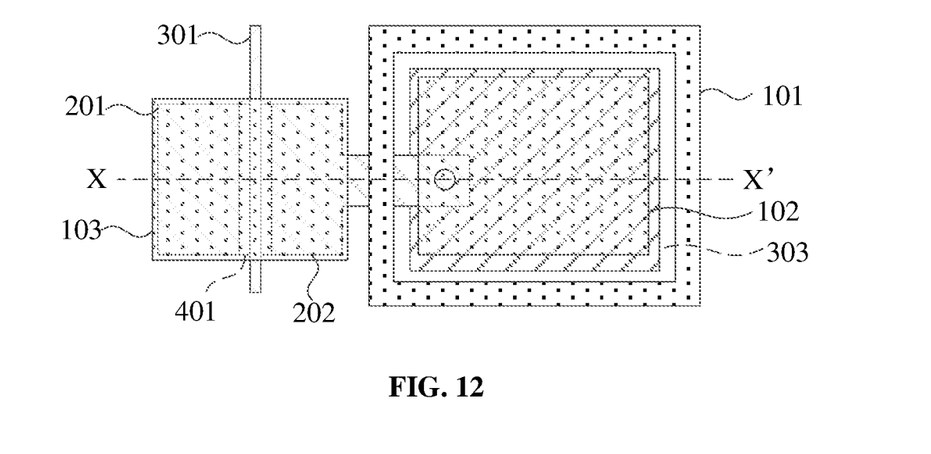
FIG. 12 illustrates a partial top view of another exemplary sensing unit according to various disclosed embodiments of the present disclosure.
Figure 13:
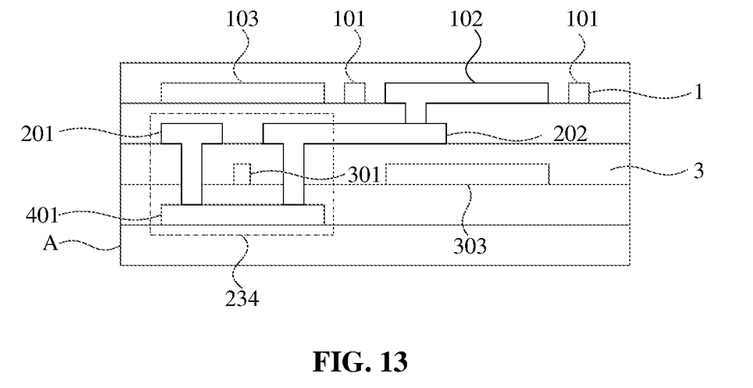
FIG. 13 illustrates an X-X'-sectional view of FIG. 12.

FIG. 12 illustrates a partial top view of another exemplary sensing unit provided by the present disclosure, and FIG. 13 is an X-X'-sectional view of FIG. 12. As shown in FIG. 12 and FIG. 13, on the basis of the foregoing embodiments, the gate 301 of the thin-film transistor 234 of the sensing unit provided by the present disclosure may be located in the second metal layer 3, and the second metal layer 3 may further include a third sub-section 303. The third sub-section 303 and the gate 301 of the thin-film transistor 234 may be insulated from each other. Along the direction perpendicular to the substrate A, the third sub-section 303 and the sensing electrode 102 may least partially overlap. Because the third sub-section 303 may be disposed on the side of the sensing electrode 102 adjacent to the substrate A, and along the direction perpendicular to the substrate A, the third sub-section 303 and the sensing electrode 102 may at least partially overlap. At this time, the third sub-section 303 may be made of metal material, that is, there may be free electrons in the third sub-section 303. When other sensing units form an electrostatic field that may interfere with the sensing electrode 102, the free electrons in the third sub-section 303 may be affected by the electrostatic field. Due to the influence of the electrostatic field, the third sub-section 303 may generate an electric field opposite to the electrostatic field, and the effects of the two electrostatic fields on the sensing electrodes 102 may cancel each other out. Therefore, the sensing electrodes 102 may receive zero electrostatic interference from the outside, and the sensitivity and accuracy of the sensing signal of the sensing electrode may be further improved.

In one embodiment, on the basis of the above embodiments, the third sub-section of the sensing unit provided by the present disclosure may be provided with a constant potential.

Referring to FIG. 12 and FIG. 13, it can be understood that the third sub-section 303 may be disposed on the second metal layer 3, and the third sub-section 303 may be insulated from the gate 301 of the thin-film transistor 234. In the direction perpendicular to the substrate A, the third sub-section 303 and the sensing electrode 102 may at least partially overlap. If a constant potential is provided to the third sub-section 303, in the space perpendicular to the substrate A, no matter in which direction the sensing electrode 102 is affected by the electric field, in the opposite direction, there may be a corresponding electric field to cancel the electric field such that the sensing electrode 102 may not be affected by the total external electric field, and may be protected from a portion of the interference of the static electricity noise from other sensing units. Thus, the sensing electrode 102 may receive the sensing signal more stably, and the sensitivity and accuracy of the sensing may be improved.

In one embodiment, on the basis of the foregoing embodiment, the sensing unit provided by the present disclosure may further include a third metal layer. The third metal layer may be located between the base substrate and the thin-film transistor.

Figure 14:
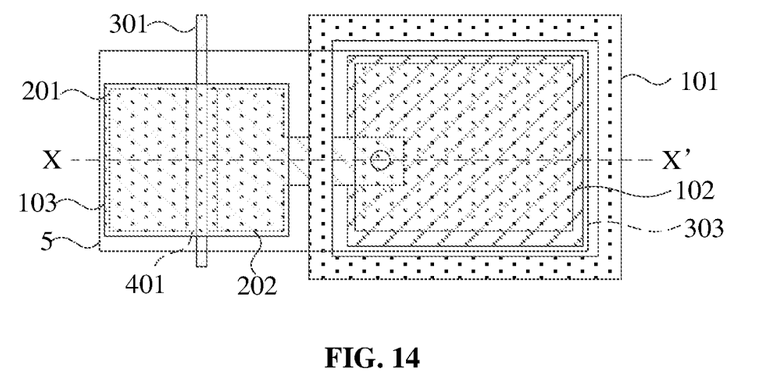
FIG. 14 illustrates a partial top view of another exemplary sensing unit according to various disclosed embodiments of the present disclosure.
Figure 15:
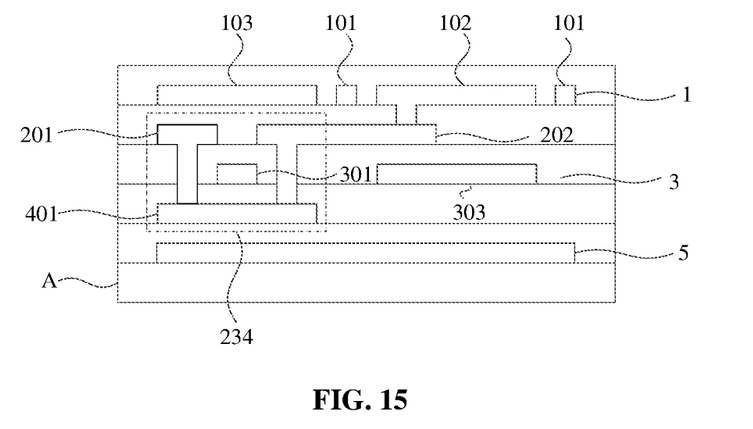
FIG. 15 illustrates an X-X'-sectional view of FIG. 14.

FIG. 14 illustrates a partial top view of another exemplary sensing unit provided by the present disclosure, and FIG. 15 is an X-X'-sectional of FIG. 14. As shown in FIGS. 14-15, on the basis of the foregoing embodiment, the sensing unit provided by the present disclosure may further includes a third metal layer 5, and the third metal layer 5 may be located between the substrate A and the thin-film transistor 234. Such a configuration may prevent the thin-film transistor of the current sensing unit 234 from generating electrostatic noise interference to other sensing units. Further, it may also, when the sensing unit 234 receives static noise interference, the ring electrode 101, the first sub-section 103, the third sub-section 303, and the third metal layer 5 respectively play the role of shielding other sensing units to the electrostatic electric field of the sensing electrode 102 in the current sensing unit. Accordingly, the effect of anti-static noise interference to the current sensing unit may be achieved, and the sensitivity and accuracy of the sensing signal of the current sensing unit may be improved. It can be understood that, to realize the best solution for anti-static noise interference shown in FIGS. 14-15, on the basis of the embodiments shown in FIGS. 14-15, the sensing unit may not include the first sub-section 101 and the third sub-section 303, the effect of shielding portions of the electrostatic noise interference may be achieved through the ring electrode 101 and the third metal layer 5. On the basis of the embodiments shown in FIGS. 14-15, the sensing unit may not include the third sub-section 303, the effect of shielding portions of the electrostatic noise interference may be achieved through the ring electrode 101, the first sub-section 103 and the third metal layer 5. On the basis of the embodiments shown in FIG. 13 and FIG. 14, the sensing unit may not include the first sub-section 103, the effect of shielding portions of electrostatic noise interference may also be achieved through the third sub-section 303 and the third metal layer 5.

In one embodiment, on the basis of the above embodiment, the material of the third metal layer of the sensing unit provided by the present disclosure may be at least one of metal molybdenum or metal aluminum, which may not only achieve the effect of shielding the electrostatic field, but also simplify the production process and reduce production costs.

In one embodiment, on the basis of the above embodiment, in the sensing unit provided by the present disclosure, along the direction perpendicular to the substrate, the third metal layer may overlap with the thin-film transistor and the sensing electrode.

Figure 16:
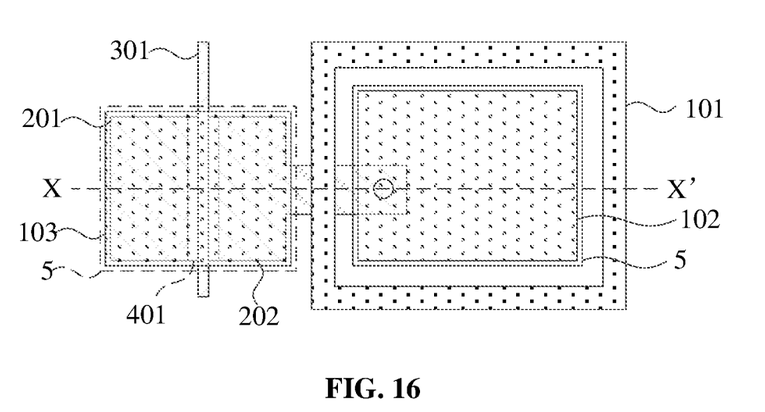
FIG. 16 illustrates a partial top view of another exemplary sensing unit according to various disclosed embodiments of the present disclosure.
Figure 17:
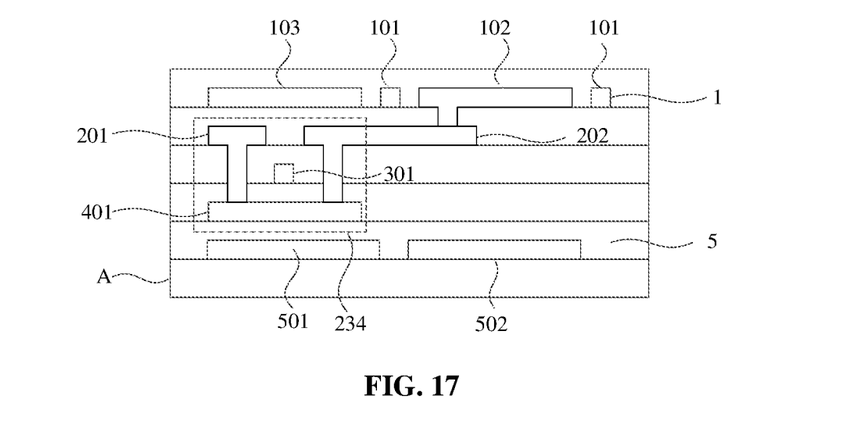
FIG. 17 illustrates an X-X'-sectional view of FIG. 16.

FIG. 14 and FIG. 16 are partial top views of exemplary sensing units accordingly to various disclosed embodiments of the present disclosure. FIG. 15 illustrates an X-X'-sectional view of FIG. 14. FIG. 17 is an X-X'-sectional view of FIG. 16. On the basis of the foregoing embodiments, as shown in FIGS. 14-15, in the sensing unit provided by the present disclosure, along the direction perpendicular to the substrate A, the third metal layer 5 may both overlap with the thin-film transistor 234 and the sensing electrode 102. Because the electrostatic noise interference of the sensing unit may mainly come from the thin-film transistor and the sensing electrode, and the structure that may directly affect the sensing sensitivity and sensing accuracy of the sensing unit may be the sensing electrode 102, to shield the electrostatic noise interference, on the one hand, it may be necessary to shield the electrostatic electric field of other sensing units on the current sensing unit, and on the other hand, it may also reduce the influence of the electrostatic electric field generated by the current sensing unit on other sensing units. Therefore, on the basis of the foregoing embodiment, if a certain metal layer is arranged along the direction perpendicular to the substrate A, it may overlap both the thin-film transistor 234 and the sensing electrode 102 to shield the effect of the electrostatic field of other sensing units to the current sensing unit and reduce the effect of the current sensing unit on the electrostatic electric field of other sensing units. The third metal layer of the sensing unit provided by the present disclosure may overlap both the thin-film transistor 234 and the sensing electrode 102 along the direction perpendicular to the substrate A, which may satisfy the above conditions. The metal layer that satisfies the above two aspects may be arranged on the same metal film layer, which may simplify the manufacturing process and save the production cost. In one embodiment, on the basis of the above embodiment, in the same sensing unit, the third metal layer 5 may be set as a continuous front surface structure, as shown in FIG. 14-FIG. 15. In another embodiment, on the basis of the above embodiment, the third metal layer may be arranged in the same sensing unit; and may be a discontinuous structure along the direction perpendicular to the substrate A and may be perpendicular to the thin-film transistor 234 and the sensing electrode 102 respectively, as shown in FIG. 16 and FIG. 17. The third metal layer 5 may include a fourth sub-section 501 and a fifth sub-section 502. Along the direction perpendicular to the substrate A, the fourth sub-section 501 and the thin-film transistor 234 may at least partially overlap, and the fifth sub-section 502 and the sensing electrode 102 may at least partially overlap. Such a configuration may save the production materials and reduce costs while achieving the purpose of the foregoing disclosure.

In one embodiment, on the basis of the above embodiments, the third metal layer of the sensing unit provided by the present disclosure may be provided with a constant potential.

Further, referring to FIGS. 14-17, along the direction perpendicular to the substrate A, the third metal layer 5 may be located between the substrate A and the thin-film transistor 234. If a constant potential is provided to the third metal layer 5, then in the space formed between the thin-film transistor 234 and the third metal layer 5 perpendicular to the substrate A, when the thin-film transistor 234 generates an electrostatic electric field, because the third metal layer 5 is provided with the constant potential, the constant potential may cancel electrostatic electric field generated by the thin-film transistor 234 can, the electrostatic noise generated by the thin film transistor 234 to the sensing electrode 102 may be blocked by the third metal layer 5 to prevent the electrostatic electric field generated by the thin-film transistor 234 from generating the interference to the sensing signal of the sensing electrode 102. Accordingly, the sensing signal received by the sensing electrode 102 may be more stable, and the sensitivity and accuracy of the sensing may be improved.

Optionally, on the basis of the above embodiment, in the sensing unit provided by the present disclosure, the thin-film transistor may include a gate, a source, a drain and an active layer. The source and the drain may be electrically connected to the active layer through a conductive via hole. The material of the active layer may include low temperature polysilicon, etc.

Figure 1:
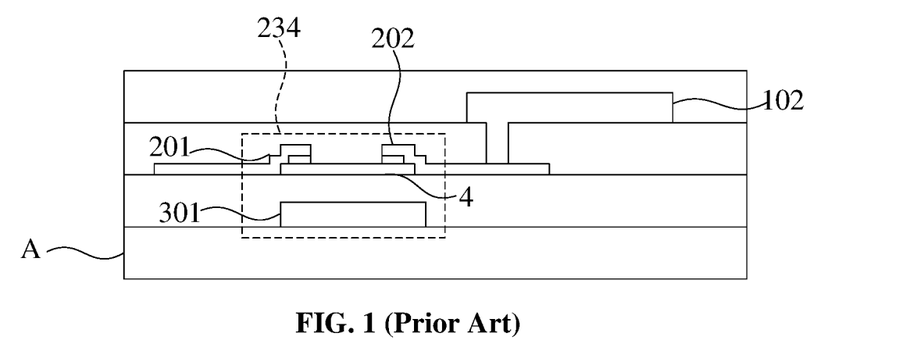
FIG. 1 illustrates a cross-sectional view of a sensing unit.

FIG. 1 is a cross-sectional view of a sensing unit. As shown in FIG. 1, the sensing unit includes a substrate A, a thin-film transistor 234, a sensing electrode 102 and various insulation layers. The thin-film transistor 234 includes a source 201, a drain 202, a gate 301 and an active layer 4. In a fingerprint identification device or a touch sensing device in the display panel, the active layer 4 in the thin-film transistor 234 of the sensing unit adopts the traditional amorphous silicon process. Because the carrier mobility of amorphous silicon is relatively low, resulting in a long response time of the sensing device and poor user experience.

FIGS. 2-17 are top views of several exemplary sensing units provided by the present disclosure and the corresponding X-X'-sectional views. As shown in FIG. 2 to FIG. 17, the active layer 401 of the thin-film transistor of the sensing unit provided by the present disclosure may adopts a low temperature polysilicon process, and the source 201 and the drain 202 may be respectively electrically connected to the active layer 401 through via holes. Compared with the amorphous silicon process in the related art, since the low temperature polysilicon has higher electron mobility, the technical solution provided by the present disclosure may improve the response speed of the sensing unit, improve the user experience, and better meet the market demand.

It can be understood that the foregoing embodiments only take the example that the gate 301 is disposed on the side of the active layer 401 away from the substrate A for illustration, but it does not mean that the position of the gate 301 in the present disclosure is limited. In the embodiments not shown in the accompanying drawings, those skilled in the art may dispose the gate 301 between the active layer 401 and the substrate A without the need for creative work, and may cancel the distance between the active layer 401 and the substrate A. The gate 301 may be provided on one side of the substrate A, or, those skilled in the art may also set the gate 301 on the side of the active layer 401 away from the substrate A and between the active layer 401 and the substrate A, the present disclosure does not specifically limit this, and the above technical solutions should all fall within the protection scope of the present disclosure.

The present disclosure also provides a sensing device. The sensing device may include the sensing unit in any of the foregoing embodiments, and may further include a driving circuit and a signal reading circuit. The gate of the thin-film transistor may be electrically connected to the driving circuit through the gate line. The source of the thin-film transistor may be electrically connected to the signal reading circuit through a data line, and the gate line may intersect the data line. The sensing electrode may be electrically connected the drain of the thin-film transistor through a via hole.

Figure 18:
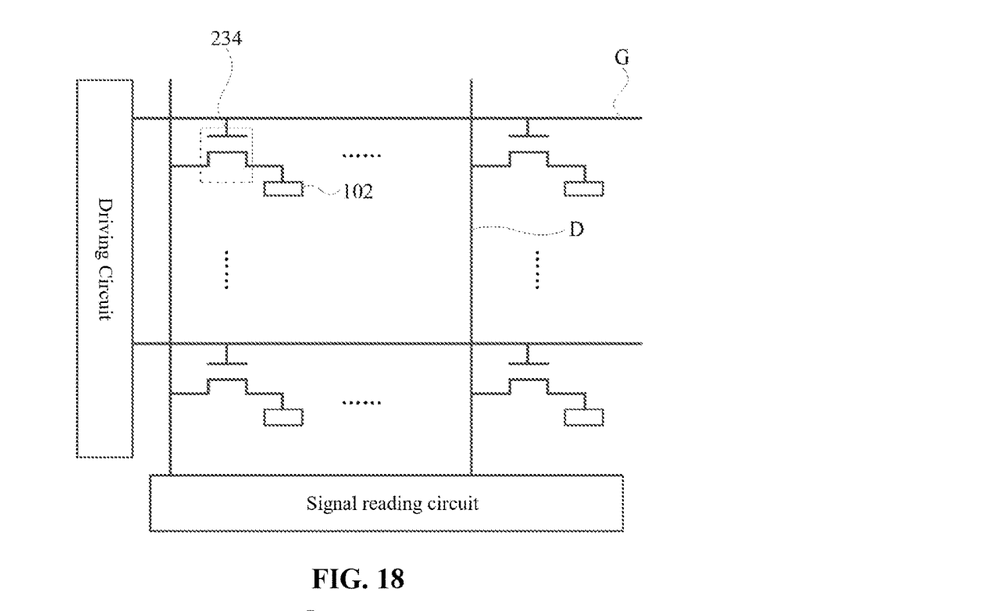
FIG. 18 illustrates a partial circuit diagram of another exemplary sensing unit according to various disclosed embodiments of the present disclosure.
Figure 19:
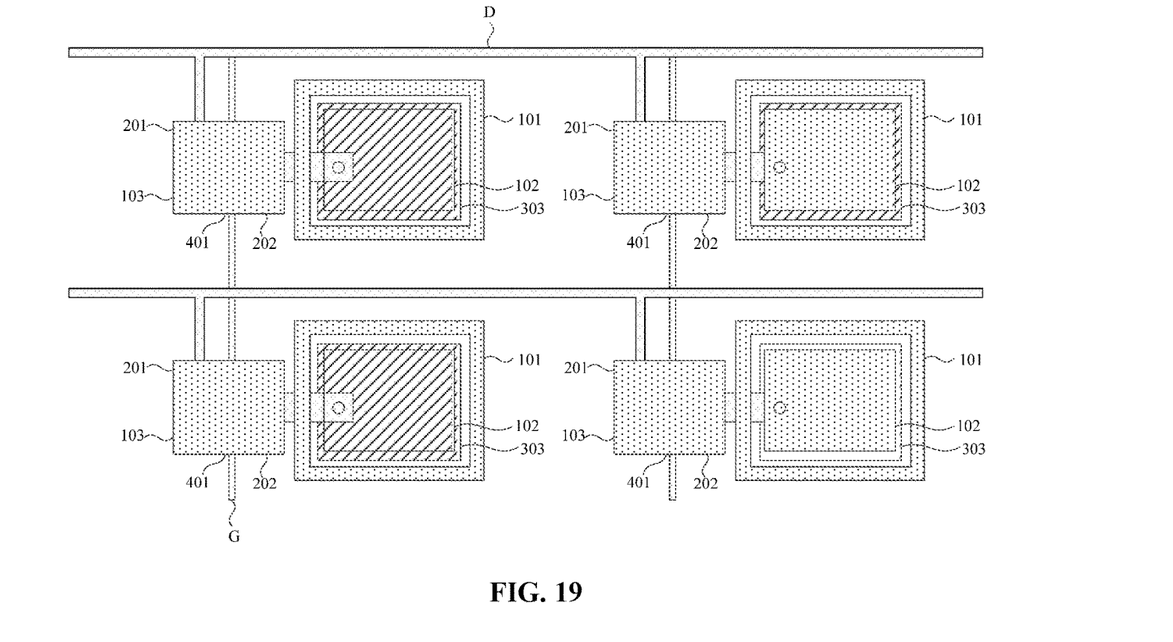
FIG. 19 illustrates a partial top view of a circuit using four sensing units as an example according to various disclosed embodiments of the present disclosure.

FIG. 18 illustrates a schematic partial circuit diagram of an exemplary sensing device according to various disclosed embodiments of the present disclosure, and FIG. 19 is a partial top-view schematic diagram of an exemplary circuit taking four sensing units as an example according to various disclosed embodiments of present disclosure. As shown in FIG. 18 and FIG. 19, the sensing device provided by the present disclosure may include a plurality of sensing units arranged as an array (due to the limitation of page size, to clearly show the structure, the sensing unit in FIG. 18 only shows a thin-film transistor 234 and the sensing electrode 102, the ring electrode, the first sub-section, the second sub-section, the third sub-section, the fourth sub-section, the fifth sub-section and other structures are omitted) and a driving circuit, and a signal reading circuit. The gate of the thin-film the transistor 234 may be electrically connected to the driving circuit through the gate line G to obtain the driving signal provided by the driving circuit. The source of the thin-film transistor 234 may be electrically connected to the signal reading circuit through the data line D. The gate line G and the data line D may intersect. The sensing electrode 102 may be electrically connected to the drain 202 of the thin-film transistor 234 through a via hole such that the signal reading circuit may obtain the signal sensed by the sensing electrode 102, thereby obtaining the desired information, such as fingerprint or touch, etc.

In one embodiment, on the basis of the above embodiments, at least one ring electrode may be disposed between any two electrodes of the sensing device provided by the present disclosure.

Referring to FIG. 19, at least one ring electrode 101 may be disposed between any two sensing electrodes 102 such that each sensing electrode 102 may be shielded from electrostatic noise by the ring electrode 101. Accordingly, the sensitivity and accuracy of the sensing signal of each sensing electrode may be improved, the overall sensing sensitivity and accuracy of the sensing device may be further improved, and the user experience may be improved.

In one embodiment, on the basis of the above embodiments, at least two ring electrodes of the sensing device provided by the present disclosure may be electrically connected.

Figure 20:
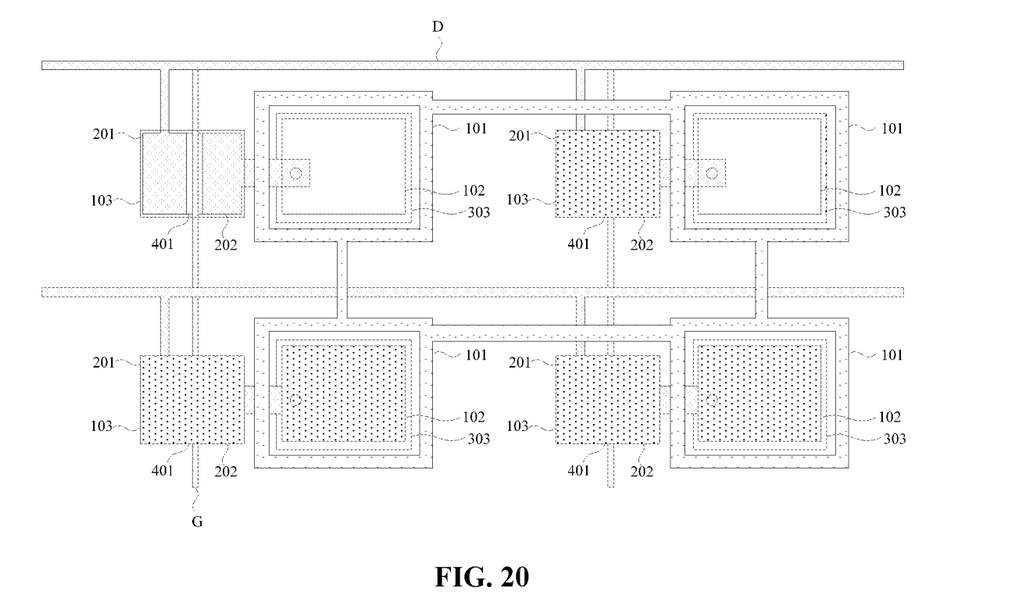
FIG. 20 illustrates a partial top view of an exemplary sensing device according to various disclosed embodiments of the present disclosure.

FIG. 20 is a partial top view of another exemplary sensing device provided by the present disclosure. As shown in FIG. 20, the electric potentials of the ring electrodes 101 that are electrically connected to each other may be same. In such a configuration, on the one hand, the electric field strength of the ring electrodes 101 that are electrically connected to each other may be the same, and the shielding effect of the electrostatic noise obtained by the sensing electrodes 102 surrounded by the ring electrodes 101 that are electrically connected to each other may be same, which may improve the working stability of the sensing device. On the other hand, when the ring electrodes 101 are supplied with a constant potential, because the ring electrodes 101 may be electrically connected to each other, it may be only necessary to supply the constant potential to one of the ring electrodes 101 to make other ring electrodes 101 electrically connected to it to obtain the same constant potential, which can simplify the circuit of the sensing device, reduce the complexity of the manufacturing process, and reduce the production cost.

Optionally, on the basis of the foregoing embodiment, in the sensing device provided by the present disclosure, along a direction perpendicular to the substrate, the ring electrode and the data line may at least partially overlap.

Figure 21:
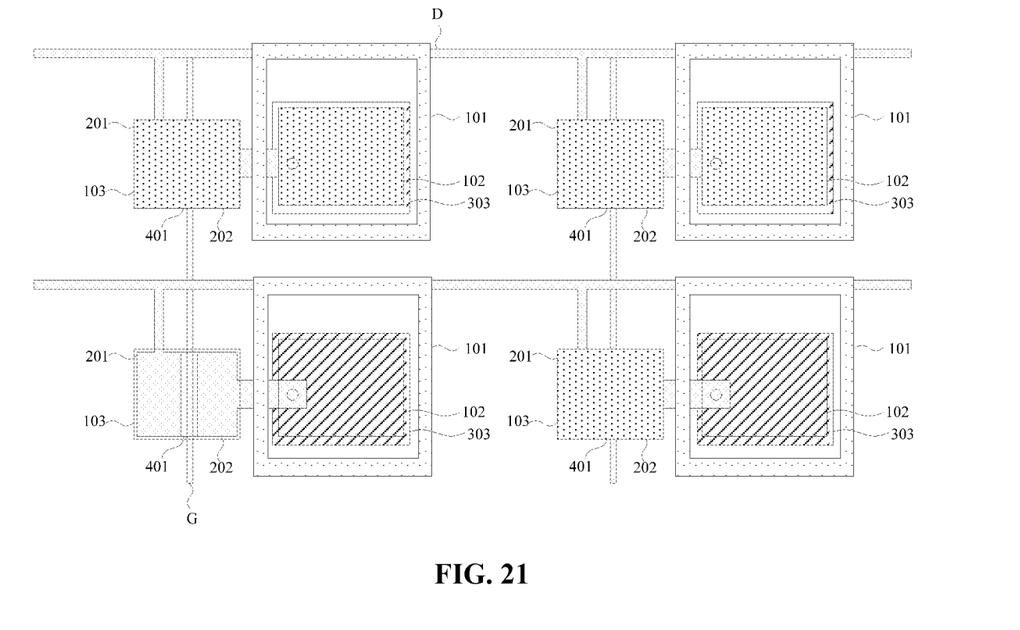
FIG. 21 illustrates a partial top view of another exemplary sensing device according to various disclosed embodiments of the present disclosure.

FIG. 21 shows a partial top view of another exemplary sensing device according to various disclosed embodiment of the present disclosure. As shown in FIG. 21, and referring to FIG. 3, FIG. 7, FIG. 9, FIG. 11, FIG. 13, FIG. 15, FIG. 17, and FIG. 19, on the basis of the foregoing embodiment, along the direction perpendicular to the substrate, the ring electrode 101 of the sensing device provided by the present disclosure and the data line D may at least partially overlap. Because the source 201 of the thin-film transistor 234 may be electrically connected to the signal reading circuit through the data line D, and the data line D and the film layer where the source 201 of the thin-film transistor 234 is located may be the same film layer, the area of the data line in the sensing device may be relatively large, it may be easy to accumulate charges to form an electrostatic field. The electrostatic field may interfere with the signal received by the sensing electrode 102, and affect the sensitivity and accuracy of the sensing signal of the sensing device. When the ring electrode 101 overlaps the data line D along the direction perpendicular to the substrate A, the electrostatic field noise interference of the data line D to the sensing electrode 102 may be shielded by the ring electrode 101, thereby improving the sensitivity and accuracy of the sensing device.

The sensing unit and the sensing device provided by the embodiments of the present disclosure may be applied to display devices such as mobile phones to realize touch control, fingerprint recognition, or other functions that need to be sensed, and may also be applied to other devices that need to realize the sensing function. The embodiment does not make any special limitation on this.

By arranging ring electrodes around the sensing electrodes, the present disclosure can effectively prevent other circuits from forming electrostatic interference to the sensing device, thereby improving the sensing sensitivity and precision.

On the other hand, the thin-film transistor of the sensing unit provided by the present disclosure may adopt the low temperature polysilicon process. Because the low temperature polysilicon may have the characteristics of high electron mobility, comparing with the thin-film transistor made of amorphous silicon, the sensing device provided by the present disclosure may significantly shorten the response time, increase the sensing speed, and improve the user experience.

The above are only the preferred embodiments of the present disclosure and the applied technical principles. Those skilled in the art may understand that the present disclosure is not limited to the specific embodiments described herein, and various obvious changes, readjustments, combinations and substitutions may be made by those skilled in the art without departing from the protection scope of the present disclosure. Therefore, although the present disclosure has been described in detail through the above embodiments, the present disclosure is not limited to the above embodiments, and may also include more other equivalent embodiments without departing from the concept of the present disclosure. The scope of the present disclosure may be determined by the scope of the appended claims.

What is claimed is:

1. A sensing unit, comprising:
   a substrate;
   a plurality of thin-film transistors and a plurality of sensing electrodes disposed on a side of the substrate; and
   a ring electrode disposed in a first electrode layer, wherein the first electrode layer is located on a side of a thin-film transistor of the rituality of thin-film transistors away from the substrate,
   wherein the plurality of sensing electrodes disposed in the first electrode layer, and the ring electrode is disposed around the plurality of sensing electrodes and does not overlap the sensing electrodes in a direction perpendicular to the substrate.

2. The sensing unit according to claim 1, wherein:
   the ring electrode is provided with a constant potential.

3. The sensing unit according to claim 1, wherein:
   the first electrode layer also includes a first sub-section; and
   in the direction perpendicular to the substrate, the first sub-section at least partially overlaps the thin-film transistor.

4. The sensing unit according to claim 3, wherein:
   the first sub-section is electrically connected to the ring electrode.

5. The sensing unit according to claim 1, wherein:
   a material of the first electrode layer includes at least one of indium tin oxide and metal molybdenum.

6. The sensing unit according to claim 3, wherein:
   a source and a drain of the thin-film transistor are located in a first metal layer;
   the first metal layer further includes a second sub-section, the second sub-section and the source of the thin-film transistor are insulated from each other, and the second sub-section and the drain of the thin-film transistor are insulated from each other; and
   in the direction perpendicular to the substrate, the second sub-section at least partially overlaps the sensing electrode.

7. The sensing unit according to claim 6, wherein:
   the second sub-section is provided with a constant potential.

8. The sensing unit according to claim 1, wherein:
   a gate of the thin-film transistor is located in a second metal layer, the second metal layer further includes a third sub-section, and the third sub-section is insulated from the gate of the thin-film transistor; and
   in the direction perpendicular to the substrate, the third sub-section at least partially overlaps the sensing electrode.

9. The sensing unit according to claim 8, wherein:
   the third sub-section is provided with a constant potential.

10. The sensing unit according to claim 1, further comprising:
    a third metal layer, disposed between the substrate and the plurality of thin-film transistors.

11. The sensing unit according to claim 10, wherein:
    a material of the third metal layer includes at least one of molybdenum and aluminum.

12. The sensing unit according to claim 10, wherein:
    in the direction perpendicular to the substrate, the third metal layer overlaps both the thin-film transistor and the sensing electrode.

13. The sensing unit according to claim 10, wherein:
    the third metal layer is provided with a constant potential.

14. The sensing unit according to claim 1, wherein:
    a thin-film transistor of the plurality of thin-film transistors includes a gate, a source, a drain and an active layer;
    the source and the drain are electrically connected to the active layer through a via hole; and
    a material of the active layer includes low temperature polysilicon.

15. A sensing device, comprising:
    a sensing unit, including a substrate; a plurality of thin-film transistors and a plurality of sensing electrodes disposed on a side of the substrate; and a ring electrode disposed in a first electrode layer, wherein the first electrode layer is located on a side of a thin-film transistor of the plurality of thin-film transistors away from the substrate, the plurality of sensing electrodes are disposed in the first electrode layer, and the ring electrode is disposed around the plurality of sensing electrodes and does not overlap the sensing electrodes in a direction perpendicular to the substrate;

a driving circuit; and
a signal reading circuit,
wherein:
a gate of the thin-film transistor is electrically connected to the driving circuit through a gate line;
a source of the thin-film transistor is electrically connected to the signal reading circuit through a data line; and
the gate line intersects the data line.

16. The sensing device according to claim 15, wherein:
at least one ring electrode is disposed between any two sensing electrodes of the plurality of sensing electrodes.

17. The sensing device according to claim 15, wherein:
at least two ring electrodes are electrically connected to each other.

18. The sensing device according to claim 15, wherein:
in the direction perpendicular to the substrate, the ring electrode and the data line at least partially overlap.

\* \* \* \* \*